Figure 1:
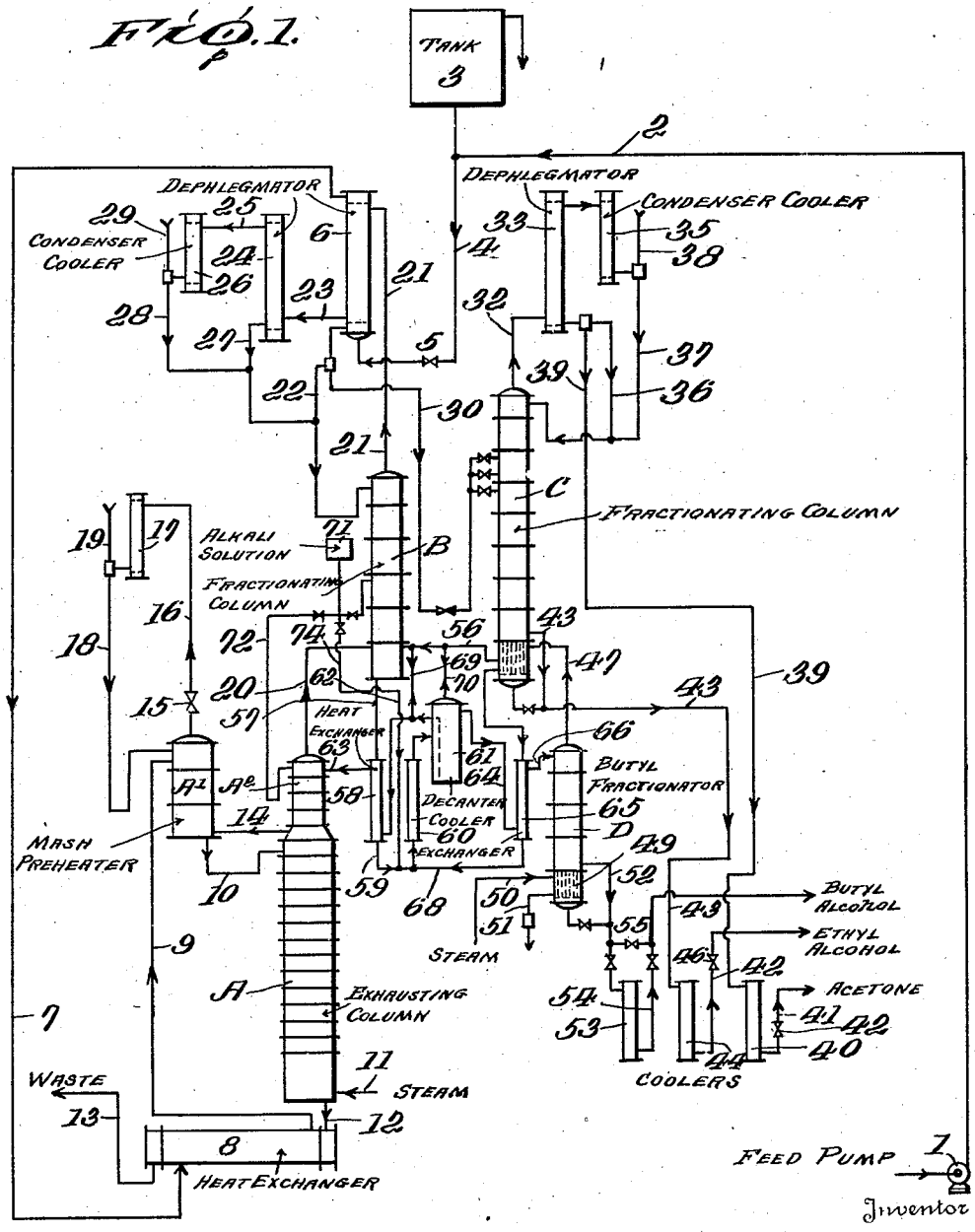

May 14, 1946.  A. PLACEK  2,400,370
PROCESS AND APPARATUS FOR PRODUCING IN THE PURE STATE, BUTYL
ALCOHOL, ACETONE, AND ETHYL ALCOHOL FROM WATERY SOLUTIONS
Filed Nov. 11, 1943  2 Sheets-Sheet 1

Inventor
Adolph Placek

By Mason, Porter & Diller,
Attorneys

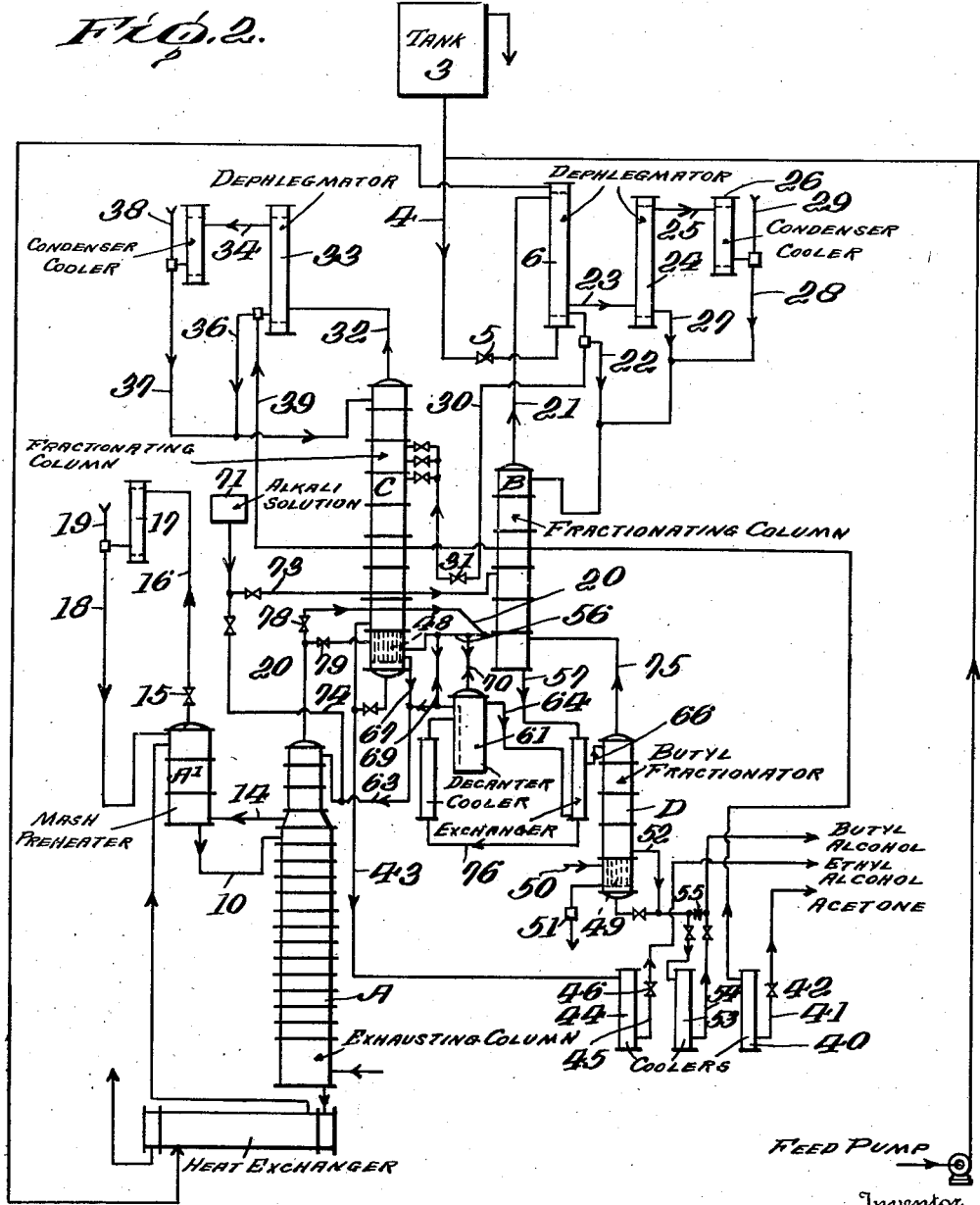

Patented May 14, 1946

2,400,370

UNITED STATES PATENT OFFICE 2,400,370

PROCESS AND APPARATUS FOR PRODUCING IN THE PURE STATE, BUTYL ALCOHOL, ACETONE, AND ETHYL ALCOHOL FROM WATERY SOLUTIONS

Adolph Placek, Philadelphia, Pa., assignor to Acme Coppersmithing & Machine Company, Oreland, Pa., a partnership of Pennsylvania Application November 11, 1943, Serial No. 509,922

7 Claims. (Cl. 202—42)

My invention relates to the production, in the pure state, of butyl alcohol, acetone and ethyl alcohol from watery solutions such as fermented mash and the like.

The object of my invention is to provide an improved process of production and an apparatus for performing it.

My invention is particularly important in the fermentation industries which produce fermented mashes containing 1.0 to 4.0% by weight of a solvent consisting of 50–65% butyl alcohol, 20–30% acetone, and 5–20% ethyl alcohol, in addition to dissolved non-condensable gases such as hydrogen and carbon dioxide.

It has been known that such mashes or weak watery solutions may be continuously distilled in an exhausting column for obtaining vapors consisting of water, butyl alcohol, acetone, ethyl alcohol and non-condensable gases. These vapors may be fractionally condensed for the purpose of separating non-condensable gases from the condensate prior to a subsequent fractional distillation and a purification of the components of said condensate.

It has also been known that the distillate vapors from the exhausting column could be subjected to a direct rectification in a second distilling column whereby to obtain a crude acetone concentrate containing ethyl alcohol with small quantities of butyl alcohol and water, and a mixture of butyl alcohol and water containing small quantities of acetone and ethyl alcohol.

The crude acetone concentrate may be rectified in a third distilling column to obtain acetone, and the residue therefrom may be rectified in a fourth column to obtain concentrated ethyl alcohol and the residues containing a mixture of butyl alcohol, water and ethyl alcohol which is returned to an earlier stage of the process for the purpose of recovery of the constituents of such residues.

The mixture of butyl alcohol and water, with traces of acetone and ethyl alcohol, is decanted into two layers, the lower containing mostly water with small quantities of butyl alcohol, acetone and ethyl alcohol. In usual practice, the lower layer is returned to the exhausting column to recover its constituents; the upper layer is rectified in a special column provided with a closed heating calandria to obtain anhydrous butyl alcohol as a residue, and a vapor substantially consisting of an azeotropic mixture of butyl alcohol and water with small quantities of acetone and ethyl alcohol, which is returned to the second column for a repeated treatment.

The processes based on a direct separation of acetone concentrate from the vapors issuing from the exhausting column have the drawback that the gaseous products which are present in the initial watery solution accumulate in the acetone concentrate fraction, interfere with fractionation and cause losses due to the entrainment of acetone through the vent pipe.

In my invention this drawback is eliminated by a step in which the mashes are preheated to the boiling point by their own vapors from the exhausting column, whereby the non-condensable gases are expelled from the boiling mashes prior to their distillation.

Due to this preliminary heat treatment, I obtain directly from the mashes vapors which are practically free of non-condensable gases and which may be fractionally condensed and rectified, whereby I obtain a mixture of acetone and ethyl alcohol with traces of water but substantially free of butyl alcohol, and a mixture of butyl alcohol and water with traces of acetone and ethyl alcohol.

It is evident that by eliminating the preliminary integral condensation of vapors issuing from the exhausting column, a great economy in heat consumption is achieved due to the fact that this heat is utilized in the subsequent fractional distillation of the components of said vapor.

As known to the art, butyl alcohol may then be separated from the residual mixtures of butyl alcohol and water by decantation, whereafter the resulting upper layer is distilled to obtain anhydrous butyl alcohol as a residue and a vapor substantially consisting of the azeotropic butyl alcohol-water mixture with inherent traces of acetone and ethyl alcohol.

I have found, moreover, that the temperature at which said decantation takes place is very important to the economy of the process and to the economical design of the apparatus applied in the process of separation of the components referred to.

When the decantation takes place at the boiling temperature of the mixtures, the lower layer contains a considerably larger quantity of butyl alcohol than if the decantation is caused to proceed at moderate temperatures, preferably at 45° to 60° C.

On the other hand, when the decantation takes place at very low temperatures, although the separation of the upper layer from the lower layer may be facilitated and the concentration of butyl alcohol in the upper layer may be increased, the quantity of butyl alcohol in the lower layer is .rger than that at the preferred optimum temperature.

Evidently, if the decantation does not take place at the optimum range of temperature, the lower layer which is returned to the primary column for recovery with a large quantity of butyl alcohol will require an increased amount of heat for exhaustive distillation, and also a larger process equipment will be necessary.

I have further found that there is sufficient amount of latent heat involved in the vaporization of mixtures from the exhausting column and in the vaporization of vapors separated from the upper layer during the preparation of anhydrous butyl alcohol to provide for the rectification and separation of pure acetone and ethyl alcohol components.

This latent heat can be indirectly abstracted from said vapors by condensation in a heating calandria and transferred to the bottom of the rectifying column which separates by fractional distillation the mixture of acetone and ethyl alcohol into its components in the pure state.

My invention will be more fully understood from the following description, when read in conjunction with the accompanying drawings.

In these drawings:

Figure 1 is a diagrammatic representation of apparatus for the carrying out of my process, and Figure 2 is a diagrammatic representation of a modified form of such an apparatus.

Figure 1 shows an apparatus in which a feed pump 1 lifts the initial mash or watery solution through pipe 2 to a constant level tank 3, from which the mash flows through pipe 4, controlling valve 5, dephlegmator 6, pipe 7, heat exchanger 8, and pipe 9, to the top of the mash preheating column $A_1$, in which it flows downward from one perforated plate to another in countercurrent to and direct intimate contact with the heating vapor issuing from the top of exhausting column A through pipe 14.

The preheated and degasified mash leaving the bottom of the column $A_1$ enters the top of the exhausting column A through pipe 10. The quantity of vapor entering the column $A_1$ is controlled by valve 15 which regulates the flow of escaping gases through pipe 16 from the top column $A_1$ in such a manner as to maintain a sufficiently high temperature at the bottom of said column $A_1$ for expelling all gases which are dissolved in the mash. This valve may be operated manually as determined by observation of the temperature at the lower portion of the column $A_1$, or automatically by a thermostatically controlled instrument responsive to and maintaining the required temperature at the lower portion of said column $A_1$.

This controlling valve 15 could equally well be placed in the inlet pipe 14 instead of in the outlet pipe 16, but in such a case the column $A_1$ must be placed sufficiently high to allow the mash to flow by gravity into the column A in order to overcome the existing pressure in said column.

The non-condensable gases, saturated with condensable vapors, escaping through pipe 16 are cooled in the vent condenser 17, and the condensate therefrom is returned to the top of column $A_1$ through pipe 18, while the non-condensable gases are vented through pipe 19.

The exhausting column A is heated by live steam introduced at the bottom through pipe 11. The exhausted mash leaves the bottom of column A through pipe 12, passes through heat exchanger 8, where it preheats the initial mash, and is withdrawn from the apparatus through pipe 13. The vapors issuing from the top of column A, after a part of them have been diverted to the column $A_1$, pass through the fractionating zone $A_2$ and through the pipe 20 to the bottom of the fractionating column B. The vapors evolving from the top of column B through pipe 21 are totally condensed in the heater-dephlegmator 6, dephlegmator 24 and condenser-cooler 26, the bottom of the dephlegmator 6, 24 being connected by the pipe 23 and the top of dephlegmator 24 being connected to the top of the cooler 26 by the pipe 25, and non-condensable gases being vented from the cooler 26 through pipe 29. A part of the total condensate is refluxed to the top of column B through pipes 22, 27, 28, while a hot part of said total condensate is led through pipe 30 and through regulating valve 31 to the middle portion of fractionating column C. The quantity of said condensate fed to the column C is regulated by valve 31 in such a manner as to maintain an optimum temperature at a fixed location in the upper part of the column B, in order to obtain a condensate which consists of acetone and ethyl alcohol with traces of water, but substantially free of butyl alcohol. Said fixed location is preferably at about one-fourth of height from the top of said column B, and the optimum temperature may vary between 58° and 65° C. according to the composition of the initial mash.

The condensed liquid leaving the bottom of column B consists of water, butyl alcohol and small quantities of acetone and ethyl alcohol. It flows through pipe 57, heat exchanger 58, pipe 59, to cooler 60, where it is cooled by water to an optimum temperature of 45° to 60° C., to the decanter 61, where it separates into two layers. The lower layer, consisting mostly of water and including butyl alcohol with small quantities of acetone and ethyl alcohol, flows through pipe 62 to heat exchanger 58 where it is reheated by the hot liquid issuing from the bottom of column B, then through pipe 63 to the top of the fractionating zone $A_2$, thus supplying a reflux to said zone, wherein said lower layer is partly exhausted of its volatile constituents and the vapor issuing from column A is partially concentrated.

The upper layer of the decantation liquid in the decanter 61 flows through pipe 64, heat exchanger 65 and pipe 66 to the top of the fractionator column D. This column D is heated at its bottom by a closed steam calandria 49 into which steam is introduced from pipe 50, while condensed steam is withdrawn through trap 51. This upper layer is fractionally distilled in said column D, whereby the liquid residue consisting of anhydrous butyl alcohol overflows from the bottom of said column through pipe 52 and cooler 53, and finally leaves the apparatus through pipe 54.

If there are still other high boiling substances, such as higher alcohols, in the initial feed liquid, they will accumulate in the butyl alcohol fraction. For such a case, the liquid from the bottom of column D is directly delivered through by-pass 55 to pipe 54 and thence to another distilling unit (not shown), in which the butyl alcohol is separated by fractional distillation from the other components.

The vapor issuing from the top of column D substantially consists of an azeotropic butyl alcohol-water mixture with traces of acetone and ethyl alcohol. This vapor is led through pipe 47 into the calandria 48 located at the bottom of column C, where, upon condensing, it gives up latent heat which is transferred through the heating surface of said calandria. This heating surface must be sufficiently large to transfer a required amount of heat to produce that amount of ethyl alcohol vapor by vaporization at the bottom of column C which is necessary for the complete separation by fractional distillation of ethyl alcohol from acetone in the acetone-ethyl alcohol mixture introduced from the column B to said column C. By this fractional distillation, there is obtained a substantially pure ethyl alcohol product which overflows from the bottom of column C, through pipe 43 and cooler 44, and finally leaves the apparatus through pipe 45 and past the valve 46.

The vapor which issues from the top of column C through pipe 32 is totally condensed in dephlegmator 33 and condenser-cooler 35 which are connected by the pipe 34, while any non-condensable gases are vented through pipe 38. The acetone condensate is partly refluxed through pipes 36 and 37 to the top of column C and partly withdrawn from the apparatus as a pure acetone product through pipe 39, cooler 40 and pipe 41. The quantity of this acetone product withdrawn from the apparatus is regulated by valve 42 in such a manner as to obtain an optimum temperature at a fixed location in the lower part of the column C, in order to obtain a condensate at the bottom of said column which is substantially free of acetone, and a vapor which forms a condensate in the dephlegmator 33 which is substantially free of ethyl alcohol. This fixed location on the column C is preferably at about one-fourth of the height from the bottom of said column C, and the optimum temperature may vary between 75° to 77° C. according to the composition of the initial mash and the vapor pressure which is maintained at said fixed location in the column C.

For neutralizing volatile acids and for saponifying any volatile esters which may originate from the distillation of initial mashes, the apparatus is provided with a reservoir 71 containing caustic soda solution or other suitable neutralizing agent which is introduced through valved pipes 72, 73, 74 to columns A₂ and B, or to the pipe 59 for mixture with the liquid to be decanted.

The condensate from the calandria 48 is withdrawn through pipe 67 and heat exchanger 65, where it reheats the upper layer overflowing from the decanter 61, and is then passed through pipe 68 for mixture with the liquid from the bottom of column D and thence through cooler 60 to the decanter 61.

The residual vapors from condensation in the calandria 48, being enriched in acetone and ethyl alcohol due to said condensation, are discharged from said calandria through the pipe 56 into the column B.

The top of decanter 61 and the overflow pipe 62 are vented through pipes 70 and 69, respectively, which are connected into the conduit 56 leading from the calandria 48 to the column B.

Figure 2 shows diagrammatically a similar apparatus to that shown in Figure 1. This apparatus comprises the same distilling columns A, A₁, A₂, B, C, and D, with the same arrangement of condensers, coolers and heat exchangers. However, the piping is arranged to perform a modified process wherein the vapor issuing from the column A₂ is led partly through pipe 20 to the bottom of column B and partly through pipe 77 to the calandria 48 at the bottom of column C.

The quantity of vapor from column A₂ to be introduced into the calandria 48 is regulated by valves 78 and 79 according to the required quantity of heat which is to be transferred to the bottom of column C, in order to vaporize that amount of ethyl alcohol vapor which is necessary for the complete separation by fractional distillation of ethyl alcohol from acetone in said column C.

The condensate from calandria 48 is withdrawn through pipe 67 and led jointly with the lower layer from the decanter 61 through pipe 63 to the top of column A₂. The residual vapor from condensation in the calandria 48, being enriched in acetone and ethyl alcohol due to said condensation, is discharged into column B.

The vapors issuing from column D, substantially consisting of a butyl alcohol-water mixture with traces of acetone and ethyl alcohol, are directly conducted to the bottom of column B through pipe 75. The recovery of the products and the system of decantation outlined in Figure 2 are analogous to those shown in Figure 1.

In each illustrative form of the invention, the fermented mash or dilute watery solution is separated, with great economy, and the three valuable components are separated from one another so that the butyl alcohol is obtained from pipe 54, the ethyl alcohol from the pipe 45, and the acetone from the pipe 41. Non-condensable gases are vented at pipes 29, 38; and water and like ultimate residues are discharged from the system at 13. In each form, the non-condensable gases are eliminated by preheating with the recovery of heat values as an incident of the discharge of wastes and the separation of vapors into condensed and non-condensed portions; and likewise the latent heats of vapors are employed directly and indirectly for effecting the fractional distillation and fractional condensations, wherewith clean-cut separations of the valuable components are effected.

It is obvious that the invention is not limited solely to the illustrative embodiments, but that it may be employed in many ways within the scope of the appended claims.

I claim:

1. A process for directly and continuously preparing in the pure state, butyl alcohol, acetone and ethyl alcohol from dilute watery solutions, which comprises: continuously distilling from said watery solution a primary vapor comprising a mixture of butyl alcohol, acetone, ethyl alcohol and water; separating said vapor by fractional condensation to form a first liquid consisting essentially of acetone, ethyl alcohol and traces of water and a second liquid consisting essentially of butyl alcohol, large quantities of water, and traces of acetone and ethyl alcohol; decanting said second liquid into an upper layer rich in butyl alcohol and a lower layer rich in water; returning said lower layer to said watery solution for further treatment; rectifying said upper layer by distillation to produce water-free butyl alcohol and a second vapor of butyl-water-ethyl alcohol-acetone mixture; indirectly transferring from said second vapor by partial condensation sufficient heat for separation of acetone from ethyl alcohol by fractional distillation of said first liquid; returning the condensate from said latter condensation to said second liquid; and returning the residual vapor from said partial condensation to said primary vapor.

2. A process for directly and continuously preparing in the pure state, butyl alcohol, acetone and ethyl alcohol from dilute watery solutions containing the same, which comprises: continuously distilling from said watery solution a vapor comprising a mixture of butyl alcohol, acetone, ethyl alcohol and water; partially condensing the vapor and thereby obtaining a partial condensate and a quantity of heat; fractionally condensing and separating from the residual vapor after said partial condensation a first liquid consisting essentially of acetone, ethyl alcohol and traces of water, and a second liquid consisting essentially of butyl alcohol, large quantities of water and traces of acetone and ethyl alcohol; fractionally distilling said first liquid by said quantity of heat to obtain a fraction consisting of substantially pure acetone and a fraction consisting of substantially pure ethyl alcohol with traces of water; decanting said second liquid to separate an upper layer rich in butyl alcohol and a lower layer rich in water; returning the partial condensate and the lower layer to the original watery solution; rectifying the upper layer by distillation to produce water-free butyl alcohol and a vaporous mixture of butyl alcohol, water and traces of acetone and ethyl alcohol; and returning said vaporous mixture to the said residual vapor from said partial condensation.

3. A process for directly and continuously preparing in the pure state, butyl alcohol, acetone and ethyl alcohol from watery dilute solutions containing the same and also including non-condensable gases, which comprises: heating the solution in a preheating zone to eliminate non-condensable gases; thereafter continuously distilling from the solution a vapor comprising a mixture of butyl alcohol, acetone, ethyl alcohol and water; passing a part of said vapor into the preheating zone whereby to provide heat for eliminating the non-condensable gases; and fractionally condensing another part of said vapor into two liquids, one of said liquids consisting essentially of acetone, ethyl alcohol and traces of water, the other said liquid consisting essentially of butyl alcohol, large quantities of water, and traces of acetone and ethyl alcohol.

4. A process for directly and continuously preparing in the pure state, butyl alcohol, acetone and ethyl alcohol from watery dilute solutions containing the same and also including non-condensable gases, which comprises: heating the solution in a preheating zone to eliminate non-condensable gases; thereafter continuously distilling from the solution a vapor comprising a mixture of butyl alcohol, acetone, ethyl alcohol and water; passing a part of said vapor into the preheating zone whereby to provide heat for eliminating the non-condensable gases; fractionally condensing another part of said vapor to form a first liquid consisting essentially of acetone, ethyl alcohol and traces of water, and a second liquid consisting essentially of butyl alcohol, large quantities of water, and traces of acetone and ethyl alcohol; permitting said second liquid to separate into an upper layer rich in butyl alcohol and a lower layer rich in water; withdrawing and rectifying said upper layer by distillation to produce water-free butyl alcohol and a second vapor comprising a mixture of butyl alcohol, water, ethyl alcohol and acetone; and employing the heat of said second vapor for effecting fractional distillation of said first liquid.

5. An apparatus for separating butyl alcohol, acetone and ethyl alcohol from dilute watery solutions containing the same and also containing non-condensable gases, which comprises a preheater, an exhaustive distilling column, a condensing column, and a fractionating column, together with conduit means for delivering watery solution into said preheater and thence delivering it to a point near the top of the distilling column, a conduit for delivering a part of the vapors from the distilling column into said preheater whereby to provoke elimination of non-condensable gases from the contents of the latter so that a liquor substantially free of non-condensable gases is brought into the distilling column, a conduit for conveying gases and vapor from said preheater to said condensing column, said condensing column being connected for discharging non-condensable gases, a conduit for returning condensed liquid from said condensing column to said preheater, and a conduit delivering another part of the vapor from said distilling column into said fractionating column whereby to effect fractional condensation of said latter portion of said vapors.

6. An apparatus as in claim 5 including in said conduit means a dephlegmator having a passageway for the watery solution moving toward said preheater and also having a passageway for vapors delivered from said fractionating column whereby said dephlegmator assists in the preheating of the watery solution, and also including therein a heat exchanger having a passageway for the watery solution on its way to the preheater and a passageway for receiving the hot still residue of the exhausting column on its way to discharge whereby also to employ the heat of said residue in preheating the watery solution.

7. An apparatus for separating butyl alcohol, acetone and ethyl alcohol from watery dilute solutions containing the same, which comprises an exhausting column in which a vapor is distilled from said watery solution; a first fractionating column for receiving vapor from the exhausting column and fractionally condensing the same to form a first liquid consisting of acetone, ethyl alcohol and traces of water, and a second liquid consisting of butyl alcohol, large quantities of water and traces of acetone and ethyl alcohol; a decanter connected for receiving said second liquid from the first fractionating column and means for bringing the said second liquid to a temperature of substantially 45° to 60° C. in said decanter; a second fractionating column connected for receiving a stratified upper layer from said decanter, said upper layer being rich in butyl alcohol, and said second fractionating column being effective for rectifying said upper layer to produce substantially water-free butyl alcohol and a second vapor containing butyl alcohol, water, ethyl alcohol and acetone; a third fractionating column having a calandria and connected for receiving and effective for fractionally distilling said first liquid for separating acetone vapor from ethyl alcohol; and a conduit for conveying the vapor from said second fractionating column into said calandria whereby the latent heat of condensation thereof is effective for heating said first liquid.

ADOLPH PLACEK.